United States Patent [19]

Ting

[11] Patent Number: 5,440,652
[45] Date of Patent: Aug. 8, 1995

[54] METHOD AND APPARATUS FOR PREPARING COLOR SEPARATIONS BASED ON N-WAY COLOR RELATIONSHIPS

[75] Inventor: David M. T. Ting, Sudbury, Mass.

[73] Assignee: Athena Design Systems, Inc., Cambridge, Mass.

[21] Appl. No.: 119,981

[22] Filed: Sep. 10, 1993

[51] Int. Cl.⁶ .................... H04N 1/58; G06K 9/48
[52] U.S. Cl. ........................... 382/165; 382/199; 382/298; 358/515; 395/109
[58] Field of Search .............. 382/17, 21, 22, 47; 358/515, 517; 395/109, 131, 133, 141

[56] References Cited

U.S. PATENT DOCUMENTS

| | | | |
|---|---|---|---|
| 4,334,274 | 6/1982 | Agui et al. | 382/22 |
| 4,433,912 | 5/1984 | Schwartz | 356/150 |
| 4,646,076 | 2/1987 | Wiedenman et al. | 395/133 |
| 4,807,298 | 2/1989 | Conte et al. | 582/56 |
| 4,849,822 | 7/1989 | Sing | 358/443 |
| 4,965,844 | 10/1990 | Oka et al. | 382/44 |
| 5,038,223 | 8/1991 | Yamada | 358/445 |
| 5,113,249 | 5/1992 | Yosefi | 358/75 |
| 5,119,440 | 6/1992 | Duenyas et al. | 382/22 |
| 5,131,057 | 7/1992 | Walowit et al. | 382/41 |
| 5,131,058 | 7/1992 | Ting et al. | 382/47 |
| 5,150,225 | 9/1992 | Kreitman | 358/456 |
| 5,172,423 | 12/1992 | France | 382/17 |
| 5,204,918 | 4/1993 | Hirosawa | 382/22 |
| 5,295,236 | 3/1994 | Bjorge et al. | 395/131 |

FOREIGN PATENT DOCUMENTS

| | | | |
|---|---|---|---|
| 0469783 | 2/1992 | European Pat. Off. | H04N 1/40 |
| 2105945 | 3/1983 | United Kingdom | 358/517 |

*Primary Examiner*—Michael T. Razavi
*Assistant Examiner*—Larry J. Prikockis
*Attorney, Agent, or Firm*—Cesari and McKenna

[57] ABSTRACT

A method and system for creating color separations comprising discrete computational objects whose edge contours are mutually compatible, such contours being defined based on user-selected n-way color relationships. The objects may be moved, copied, scaled, re-oriented, altered in appearance or resolution, or otherwise manipulated by a user as units. In operation, the invention analyzes a multicolored pixelmap to identify edges associated with regions of a particular color. As it traces an edge the invention generates a secondary edge whose distance from the original edge is determined by the pairwise relationship between the adjacent colors; that distance may vary as the color abutting the edge changes. The pixels along the secondary edge are stored as an order list of pixels that defines the object thus traced.

16 Claims, 3 Drawing Sheets

METHOD AND APPARATUS FOR PREPARING COLOR SEPARATIONS BASED ON N-WAY COLOR RELATIONSHIPS

BACKGROUND OF THE INVENTION

A. Field of the Invention

The present invention relates to electronic storage and reproduction of design images, and in particular to preparation of printing plates for and direct output of complex color designs.

B. Description of the Related Art

In commercial printing applications, color images are usually printed in separate, successive stages of ink or dye application. Each layer of color is applied directly atop the previous stage, generally by a printing device having a series of single-color inking stations that each make sequential, registered contact with the substrate.

The number of color stages required for complete image rendition depends on the "color model" chosen as the basis for representation. Although the CYMK model, consisting of blue (cyan), magenta, yellow, and black components is frequently employed in commercial applications involving paper substrates, a wide variety of models is employed for textile and surface designs. Multicolored images are separated into a set of monochrome representations in accordance with the selected color model, each separation corresponding to the contribution of a particular color to the overall image.

The process of generating suitable separations can be quite complex, particularly in cases involving mass reproduction of artistic images. Graphic designers typically work with a large palette of colors, necessitating highly accurate and versatile separation techniques to retain these colors throughout the printing process. Furthermore, printing materials—particularly non-paper substrates—tend to react differently to various dyes or inks (hereafter referred to generically as "color carriers"); for example, the wicking properties of fabric frequently vary with the applied color carrier, resulting in different degrees of spreading (or "bleeding") beyond the borders of application. The order of color-carrier application can also be important, since the amount of wicking may depend, for example, on whether dye is applied to dry fabric or to a portion that has already been dyed and fixed. Finally, the extent and character of interaction among color carriers as they are applied can depend strongly on the particular color combination.

Until recently, graphic artists have created works using traditional materials, which were reproduced photographically and processed using optical techniques into separations. Developments in computer-aided design ("CAD") technology, however, have considerably broadened the degree to which graphic artists can render complex color designs electronically. CAD-generated images are digitally stored as discrete picture elements, or "pixels," with each pixel corresponding to an identified image point. The entire set of pixels representing an image is termed a "pixelmap" of the image. While simple monochrome image pixels can consist of single computer-memory bits, each of which indicates whether the corresponding image point is light or dark, color image pixels require additional specification information (e.g., values for hue, color value, and saturation, or an index for a specific dye formulation). As used herein, the term "pixelmap" refers to raster pattern of pixels and/or bits. A multicolored pixelmap can be subjected to various algorithmic operations, now well-characterized in the art, to resolve the image into color separations.

While such color-separation algorithms accurately implement a color model, they do not capture and reflect the myriad variations in final appearance that can result from interactions between applied color carriers and the substrate and among themselves. Failure to render the separations in a manner that accommodates characteristics of the printing process results in visually perceptible, and therefore unacceptable, deviations from the artist's original conception.

Unfortunately, the complexity of the numerous possible interactions makes their management quite difficult. A graphic designer's work may be nearly as complex as a continuous-tone photograph, with considerable density and hue variations occurring over small image areas and, frequently, also including regions of fine detail. Global calibrations that affect all instances of a particular color ignore the effect of adjacent colors, while adjustments on a pixel-by-pixel basis that account for the identities of neighboring pixels are impractical. Furthermore, some deviation in the final printed image from the artist's original design may be necessary to accommodate mechanical limitations of printing equipment in achieving perfect registration.

DESCRIPTION OF THE INVENTION

SUMMARY OF THE INVENTION

The present invention provides a method and system for analyzing a multicolor pixelmap and generating therefrom a series of digitally represented color separations whose edge contours have been adjusted to accommodate color interaction, such contours being explicitly defined based on user-selected n-way color relationships. As used herein, a "color relationship" refers to the interaction between a pair of colors in a particular printing environment (and may stem, for example, from characteristics associated with the particular color carriers, the substrate and/or mechanical features of the application device); an "n-way color relationship" refers to the set of interactions among one applied color and the remaining colors in a color model containing n hues, where n is an integer.

The separations created by the present invention are "object-oriented," in the sense that each is specified by a vector outline description that defines a single closed region; vector "objects" may be individually or collectively moved, copied, scaled, re-oriented, altered in appearance or resolution, or otherwise manipulated by a user as discrete units. Defining separations in object form provides considerable flexibility both computationally and in terms of a user's ability to create or alter designs with a minimum of commands or keystrokes.

In accordance with the invention, pixels in a pixelmap are scanned, row by row, until an edge—that is, a transition between a selected color and any other color—is detected. At this point the invention follows the edge until it reaches the original starting point or the pixelmap border, in the process generating a secondary edge whose distance from the actual edge is determined by the pairwise relationship between the adjacent colors; that distance may, of course, vary as the color abutting the edge changes. For example, in many applications an edge is expanded when the abutting region is of darker hue, and contracted or left undisturbed when the abutting region is lighter.

The pixels along the secondary edge are stored as a vector outline description, preferably an ordered list of locations and color attributes, that defines the object thus traced. The invention then continues its row-by-row scan of the pixelmap, searching for the next as-yet undefined edge and vectorizing a new object when this edge is found.

The scanning and vectorization operations are performed on the pixelmap for each color of the color model. Each set of objects, as defined during a particular scan, collectively forms a color separation that may be output to, for example, a printer or platemaking device, or manipulated digitally by the user. The vectorized object representations generated by the present invention provide tremendous data compression as compared with traditional storage modes, which typically include storage of the entire bitmap for each color separation.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
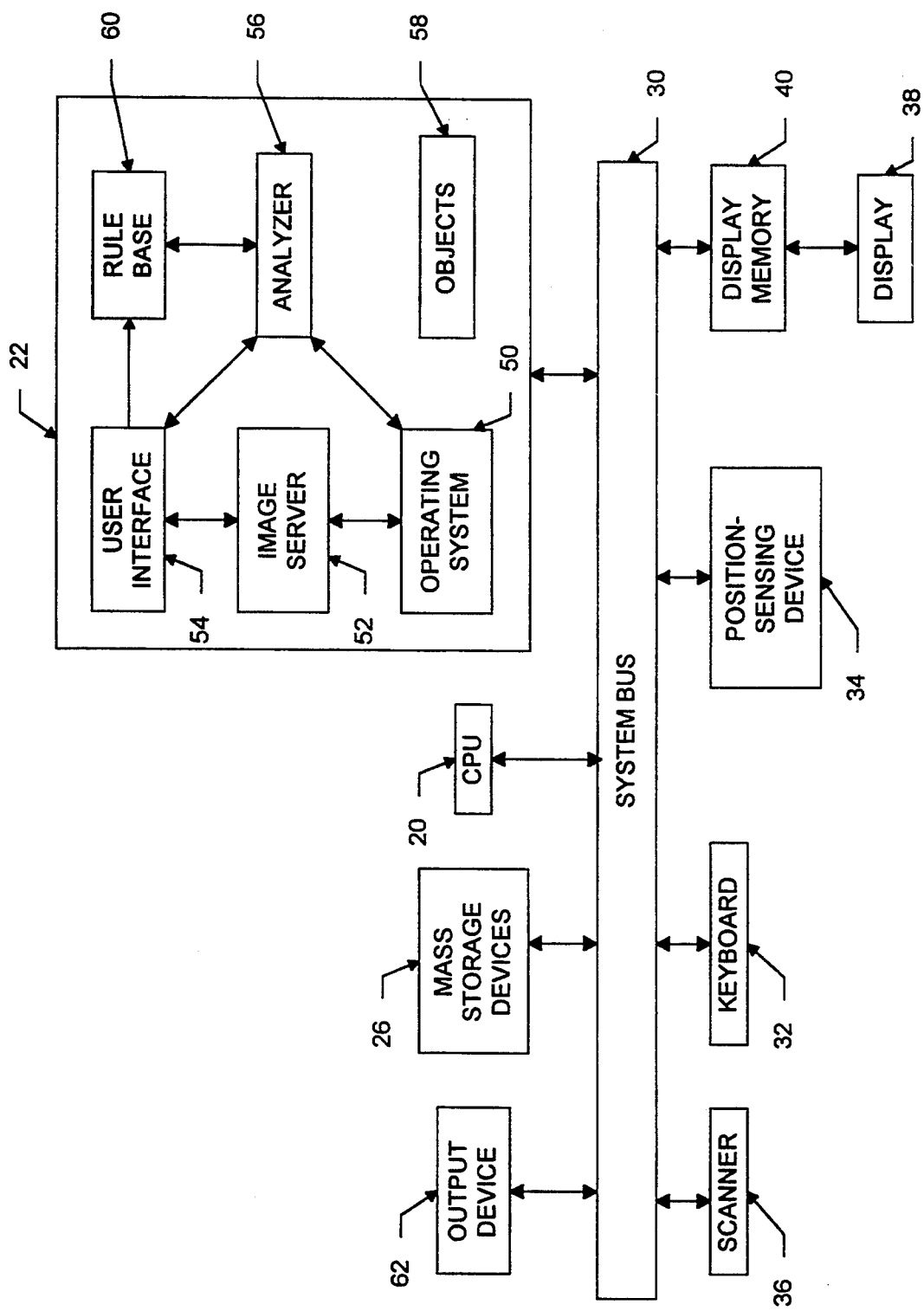
FIG. 1 is a block diagram of an electronic imaging and composition system that incorporates the present invention.

Refer first to FIG. 1, which illustrates, in block-diagram form, a system incorporating the invention. As indicated therein, the system includes a central processing unit (CPU) 20, which performs operations on and interacts with a main system memory 22 and components thereof. The system further includes at least one mass storage device 26, which contains permanent files of image information created by the user. All components of the system communicate over a system bus 30.

The user interacts with the system using a keyboard 32 and, preferably, a position-sensing device (e.g., a mouse) 34. The output of either device can be used to designate information, select particular areas of a screen display 38 corresponding to functions to be performed by the system, or directly generate image data by means of appropriate design software. Alternatively or in addition, images can be digitized and stored by means of a scanner 36. The contents of display 38 are specified by a display memory 40 and its contents.

The main memory 22 contains a group of modules that control the operation of CPU 20 and its interaction with the rest of the system. An operating system 50 directs the execution of low-level, basic system functions such as memory allocation, file management and operation of mass storage devices 26. An image server 52 operates at a higher system level, and directs display of image files bounded by known memory-address locations. Software capable of executing the functions of image server 52 is well-characterized in the art.

Display memory 40 defines a "raster," i.e., a regular two-dimensional pattern of discrete pixel positions that collectively covers the image area of display 38. The contents of each location in display memory 38 directly governs the appearance of a corresponding image pixel on display 40. When the user determines the image shown on display 38 to be satisfactory, that image can be sent to an output device 62 (such as a full-color laser printer). Typically, image server 52 provides image data to output devices in vector or other compatible format, which the device rasterizes at the appropriate resolution for output. Alternative arrangements are also possible, however; for example, image server 52 can fully rasterize the image for transfer to an output device, or the device itself be configured to interpret image data in the format utilized by image server 52.

The user interface 54, which operates at the highest level of interactivity, generates words or graphical images on display 38 to prompt action by the user, and accepts user commands entered from keyboard 32 and/or position-sensing device 34 to create or retrieve images.

It must be understood that although the modules of main memory 22 have been described separately, this is for clarity of presentation only; so long as the system performs all necessary functions, it is immaterial how they are distributed within the system and the programming architecture thereof. Likewise, although conceptually organized as grids, pixelmaps need not actually be stored digitally in this fashion. Rather, for convenience of memory utilization and transmission, the raster pattern is usually encoded as an ordered array of pixels. Once again for clarity of presentation, the ensuing discussion will not differentiate between conceptual organization and actual storage, it being understood that any of a variety of storage formats will support the grid construct.

Execution of the key tasks associated with the present invention is directed by an analyzer 56, which governs the operation of CPU 20 and controls its interaction with main memory 22 in performing the steps necessary to create image objects. As they are created, these objects receive identifiers and are stored in a memory partition 58; preferably, the identifiers are cataloged and stored in a database, also residing within memory partition 58, that permits the identifiers to be associated with one another (thereby enabling, for e ample, the convenient retrieval of related objects or those of the same color, which collectively define a complete separation); with the vector descriptions; with information regarding object type (as discussed below); and with such other attributes as are desired by a user.

Rules that define the n-way color relationships, and thereby provide the basis for edge adjustment, as discussed below, are stored in another memory partition 60; preferably, the rules may entered by a user interacting with user interface 54. These rules are specific to each color and its interaction with other colors, and stem from such factors as the user's knowledge of the color carrier's behavior, the order in which colors are to be applied, properties of the substrate, and mechanical features and limitations (e.g., registration requirements) associated with the application device.

In operation, analyzer 56 scans a pixelmap of a desired image, row by row, until it detects a color transition (from one pixel to the next) to or from a first selected color from the color model. The pixelmap may be stored in display memory 40; alternatively, however, the contents of display memory 40 can instead contain only a portion of the overall image, which is stored elsewhere in main memory 22.

Figure 2:
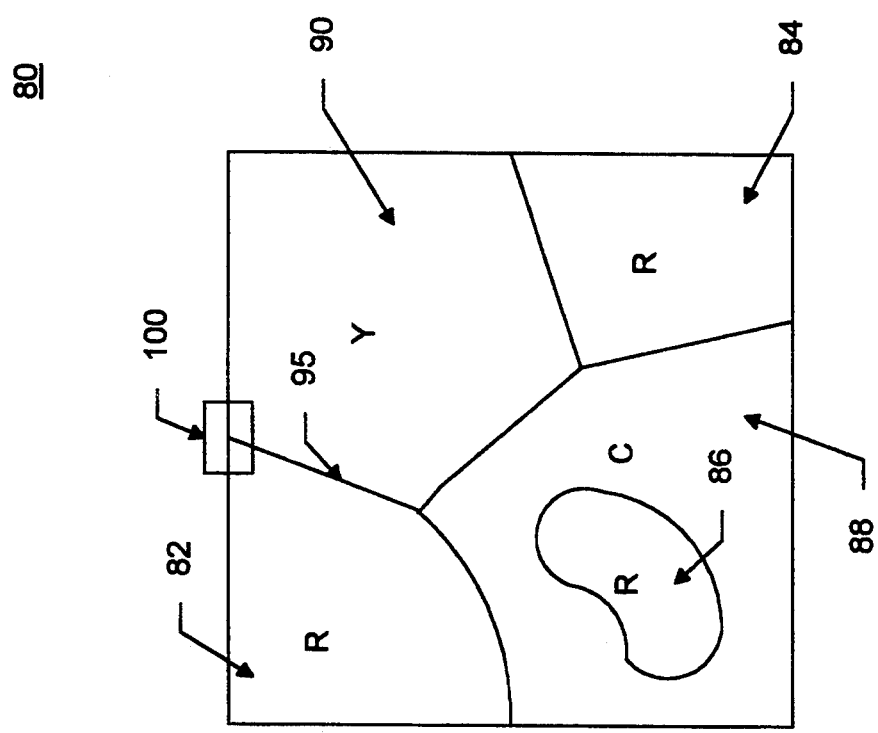
FIG. 2 illustrates a representative image pixelmap.

The analysis process is illustrated in FIG. 2, which shows an image 80 that contains a series of contiguous color fields 82, 84, 86, 88 and 90; for simplicity, a traditional CMYK color model—based on the colors cyan, magenta, yellow and black—is assumed, although alternative models, such as those in which pixels indicate specific dye indices or colors, can easily be employed instead. Accordingly, the fields .82, 84 and 86 are red; field 88 is cyan; and field 90 is yellow. Furthermore, the following transition rules, stored as a production series in rule base 60, are assumed to apply:

Red
  To yellow: contract red edge one pixel
  To cyan: expand red edge one pixel
  To black: no change
Yellow
  To red: expand yellow edge one pixel
  To cyan: expand yellow edge one pixel
  To black: expand yellow edge one pixel
Cyan
  To red: no change
  To yellow: contract cyan edge one pixel
  To black: no change
Black
  No changes regardless of transition Analyzer 56 first selects a color from the color model, e.g., red, and proceeds to scan the pixels of pixelmap 80. Assuming analyzer 56 begins the scan at the top left corner, it immediately encounters pixels of the first-selected color, and records the location of each encountered red pixel; these pixels are part of the edge of region 82 since they reside along a pixelmap boundary. Analyzer 56 detects an edge at boundary 95, at which point scanning ceases.

Figure 3:
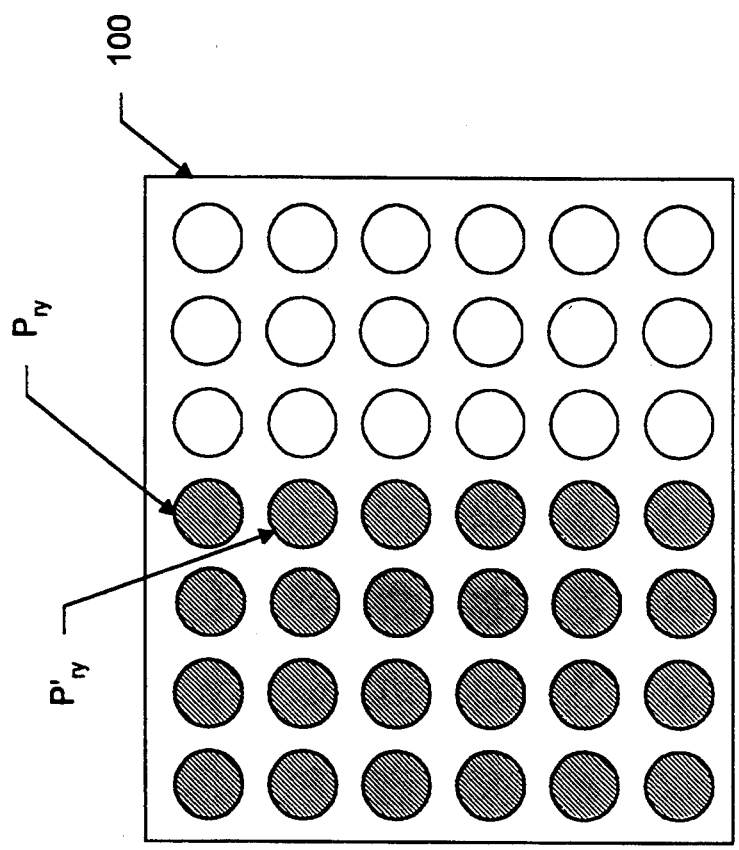
FIG. 3 is an enlarged view of the region denoted in FIG. 2 by reference numeral 100.

Analyzer 56 then executes an edge-following procedure to trace the edge 95 across regions 90 and then 88. This sequential procedure involves examining, in an ordered manner, the nearest neighbors to an already-identified edge pixel to identify the next edge pixel, and repeating this process until all edge pixels have been identified and the original starting pixel is again encountered. The preferred technique is best understood with reference to FIG. 3, which illustrates in greater detail the area indicated in FIG. 2 by reference numeral 100. In FIG. 3, red pixels are shaded and yellow pixels appear hollow.

In its scan of the first (top) row, analyzer 56 encounters transition pixel $P_{RY}$ and identifies it as an edge pixel. Analyzer 56 then sweeps around the four pixels neighboring $P_{RY}$ in a clockwise fashion until a red pixel is encountered after a yellow pixel, and identifies that red pixel, $P'_{RY}$, as the next edge pixel. Similarly, analyzer 56 identifies the subsequent edge pixel by sweeping around the six pixels surrounding the just-identified edge pixel $P'_{RY}$ until, once again, a red pixel is encountered after a yellow pixel.

As analyzer 56 sequentially defines the edge of region 82, it simultaneously defines a secondary edge based on the instantaneous pairwise relationship between edge pixels. Thus, referring to the pairwise rules for red transitions, analyzer 56 discovers that a red-to-yellow transition requires contraction of the red edge by one pixel. It therefore searches for the nearest pixel in the direction of contraction, which will be either adjacent or disposed diagonally to the primary-edge pixel. In the case of contractions or expansions of magnitudes greater than one pixel, the foregoing process is iteratively executed.

Thus, for pixel $P_{RY}$, the corresponding secondary-edge pixel is the red pixel immediately to the left. Analyzer 56 adds the location of this secondary-edge pixel to the ordered list that will comprise the object (i.e., region 82).

Eventually analyzer 56 encounters a red-to-cyan, rather than red-to-yellow transition as it traces the part of edge 95 that borders region 88. The pairwise color relationship between red and cyan dictates a different secondary-edge operation, namely, expansion of the red edge by one pixel. Consequently, along this segment of edge 95, analyzer 56 notes the locations of pixels positioned just outside the true edge 95.

When analyzer 56 reaches a pixelmap border in the course of edge tracing, it suspends the sweeping procedure and follows the border unless and until it detects a color transition, in which case sweeping is resumed. In the present example, analyzer 82 records the locations of pixels along the left border of pixelmap 80 from its intersection with edge 95 to the top left corner.

The result of the foregoing edge-definition process is an ordered list of pixel locations that collectively define the perimeter of object 82. These edge pixels include the upper border of pixelmap 80 from the top left corner to edge 95; the contracted and expanded secondary edges that follow edge 95 to the left border of pixelmap 80; and the pixels along the left border of pixelmap 80 to the top left corner. All of these pixels, as well as the interior pixels, share the same color attribute (i.e., red), which can be stored once as a global characteristic applicable to the entire object.

The ability to store objects as sets of pixel locations with global color attributes greatly reduces storage requirements as compared, for example, with full storage of the entire pixelmap corresponding to a given color separation. Compression can be enhanced still further by storing only the locations of perimeter pixels, and generating the interior pixels only when it becomes necessary to recreate an object (or the set of all objects corresponding to a separation) as a pixelmap. Filled objects can be obtained, for example, by applying the perimeter as a mask to a color-surface pixelmap that is at least slightly larger than the object, using logical AND operations between points inside the object perimeter and points on the color-surface pixelmap (and taking account of nested objects, as described below).

After object 82 has been fully specified, analyzer 56 recommences row-by-row scanning (ignoring pixels that have already been assigned to object 82) until a new object edge is identified. That edge is the top edge of region 84, detection of which prompts a new execution of the object-definition procedure described above. The final execution defines object 86.

Analyzer 56 then selects a new color from the color model, e.g., cyan, and proceeds to scan pixelmap 80 and define cyan objects in the foregoing manner. This process continues until all colors of the color model have been exhausted, a condition indicating that pixelmap 80 has been fully analyzed and is now represented as a series of objects.

At this point, in order to ensure absence of unwanted color overlap during printing, analyzer 56 executes a procedure to locate objects nested within other objects. That procedure involves scanning the pixels inside each defined object for transitions in the manner previously employed to define object edges. Thus, while pixel scanning will reveal no color transitions within objects 82, 84, 86 and 90, indicating the absence of nested objects within these color regions, a cyan-to-red transition will be detected when the border of object 86 is encountered. The primary edge defined by object 86 is thereupon traced by the edge-following procedure described above. The pairwise rules specify no expansion or contraction of cyan contours that border red color regions; however, if expansion or contraction were called for, a secondary edge would be generated in the manner discussed previously.

After it is defined, the new object's identifier is associated with that of the object in which it is contained, and also with a tag that identifies it as a "negative" object—i.e., that pixels within its contour are turned off (inactive) when the surrounding object is stored or rendered.

The present invention is also equipped with features that prevent edge contraction from producing a "reverse-overlap" condition, i.e., where contraction of opposing edges results in secondary edges that touch or cross one another; this condition can produce secondary edges spaced as far or even farther apart than the original edges. Identification of reverse-overlap regions is accomplished by following the secondary edges and checking for edge tangency or crossover. Where either condition is detected, the point or points of tangency, or the closed loop formed by crossed-over edges, are either discarded (resulting in formation of two distinct, unattached objects which receive separate identifiers) or, if the user wishes to retain a single object, the amount of edge contraction is reduced until the reverse overlap is eliminated and the secondary edges are spaced slightly apart. In the illustrated embodiment, analyzer 56 performs this procedure.

Conversely, the present invention can be adapted to eliminate spaces between objects that are so small as to be visually unappealing (a condition sometimes referred to as a "gap" or a "grin"). In this case, analyzer 56 traces the exterior contour of an object's secondary edges to determine whether exterior contours associated with any other objects lie within a predetermined distance therefrom or whether the enclosed area is smaller than a specified lower limit. If so, the region between objects is filled in between edge pixels spaced closer than the predetermined distance, thereby joining two previously discrete objects into a single object. Preferably, this operation is performed along with the reverse-overlap remediation procedure discussed above, with inter-object distance being measured with respect to edge points generated to avoid reverse overlap.

It will therefore be seen that the foregoing represents a highly advantageous approach to representation and output of color separations in complex color environments. The system is useful in design systems configured to utilize vector-space representations of color regions, and accommodates edge adjustment to account for pairwise color relationships and "gap and grin" spaces. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of creating, from a pixelmap image datafile comprising a plurality of pixel locations, vectorized chromatic separations in accordance with a selected color model comprising a plurality of colors, the method comprising the steps of:
   a. defining pairwise color-relationship rules between the colors of the color model, each rule specifying an expansion or contraction distance for a color, the distance depending on the identity of an adjacent color;
   b. selecting a color of the color model;
   c. identifying, within the pixelmap, an initiating edge pixel lying at a transition between a selected color and pixels of at least one other color;
   d. for each edge pixel so identified,
      i. defining, on a pixel-by-pixel basis, a primary edge by identifying a plurality of adjacent pixels that collectively define a contiguous edge, each pixel lying at a transition between a region of the selected color and pixels of at least one other color;
      ii. defining, on a pixel-by-pixel basis, a secondary edge by identifying, for each pixel of the primary edge, a corresponding secondary-edge pixel whose absolute distance from the primary-edge pixel is determined by the pairwise color relationship between the primary-edge pixel and the nearest pixel of a different color:
   e. storing the secondary edge as an ordered list of pixels;
   f. repeating steps (c) and (d) until the pixelmap contains no unidentified edge pixels; and
   g. repeating steps (b) through (f) for each remaining color of the color model.

2. The method of claim 1 wherein the pixelmap is organized as a series of pixel rows, and further wherein an initiating edge pixel is identified by scanning the pixelmap row-by-row until a transition is detected between the selected color and any other color.

3. The method of claim 1 wherein primary-edge pixels are identified by determining, with respect to an already-identified edge pixel, the colors of all neighboring pixels in a clockwise fashion until a pixel of the selected color is encountered after a pixel of any other color, and storing the pixelmap location of the thus-encountered pixel.

4. The method of claim 1 wherein the pairwise color-relationship rules are determined by characteristics associated with color carriers associated with the colors, the order in which the color carriers are to be applied, properties of a substrate to which the color carriers are to be applied, and mechanical features and limitations associated with a device that applies the color carriers.

5. The method of claim 1 wherein the secondary edge is further defined by a color attribute.

6. The method of claim 5 wherein the ordered list of pixel locations includes all edge pixels and interior pixels associated with the region.

7. The method of claim 5 wherein the ordered list of pixel locations includes only edge pixels.

8. The method of claim 1 further comprising the steps eliminating interior regions within the defined secondary edges that differ in color from that of the secondary edge by:
   a. identifying, within a region of the pixelmap defined by a secondary edge, an initiating edge pixel whose color differs from that of the secondary edge;
   b. defining an interior-region primary edge by identifying a plurality of adjacent pixels that collectively define a contiguous edge, each pixel lying at a transition between the color of the secondary edge and that of the interior region;

c. defining an interior-region secondary edge by identifying, for each pixel of the primary edge, a corresponding interior-region secondary-edge pixel whose absolute distance from the interior-region primary-edge pixel is determined by the pairwise color relationship between the primary-edge pixel and the nearest pixel of a different color;

d. storing the interior-region secondary edge as an ordered list of pixels; and e. identifying the interior-region vector description as a negative object and associating it with the secondary edge.

9. The method of claim 1 further comprising the steps of eliminating reverse overlap among secondary edges by:

a. examining the secondary edges to determine whether the pixels of any first edge cross or occupy the same locations as the pixels of any other edge; and b. for each pair of edges containing pixels that cross or occupy the same locations, eliminating such pixels from the edges.

10. The method of claim 1 further comprising the steps of eliminating unacceptably small gaps between discontiguous secondary edges of a single color by:

a. examining the secondary edges to determine whether the pixels of any first edge lie within a predetermined distance of the pixels of any other edge of the same color; and b. for each pair of edges containing pixels that lie within the predetermined distance of one another, defining a new edge that unites the two discontiguous secondary edges and surrounds the pixels identified as lying within the predetermined distance.

11. The method of claim 1 further comprising the steps of eliminating reverse overlap among secondary edges by:

a. examining the secondary edges to determine whether the pixels of any first edge cross or occupy the same locations as the pixels of any other edge; and b. for each pair of edges containing pixels that cross or occupy the same locations, adjusting the edges such that no pixels cross or occupy the same locations.

12. Apparatus for creating, from an electronically stored pixelmap image datafile comprising a plurality of pixel locations, vectorized chromatic separations in accordance with a selected color model comprising a plurality of colors, the apparatus comprising:

a. means for electronically storing pairwise color-relationship rules between the colors of the color model, each rule specifying an expansion or contraction distance for a color, the distance depending on the identity of an adjacent color;

b. means for selecting a color of the color model;

c. means for interpreting the pairwise color-relationship rules;

d. means for analyzing the pixelmap, identifying therein an initiating edge pixel lying at a transition between a selected color and pixels of at least one other color, and for each edge pixel so identified:

i. defining, on a pixel-by-pixel basis, a primary edge by identifying a plurality of adjacent pixels that collectively define a contiguous edge, each pixel lying at a transition between a region of the selected color and pixels of at least one other color;

ii. defining, on a pixel-by-pixel basis, a secondary edge by identifying, for each pixel of the primary edge, a corresponding secondary-edge pixel whose absolute distance from the primary-edge pixel is determined by the pairwise color relationship between the primary-edge pixel and the nearest pixel of a e. means for electronically strong the secondary edge as an ordered list of pixels.

13. The apparatus of claim 12 further comprising a database for storing information relating to each secondary edge, the information comprising:

a. an identifier;

b. the color, if any, associated with the secondary edge;

c. a list of any related edges; and d. whether pixels lying within the boundary defined by the secondary edge are active or inactive.

14. The apparatus of claim 12 wherein the pixelmap is organized as a series of pixel rows, and further wherein the means for analyzing the pixelmap includes processor means for identifying an initiating edge pixel by scanning the pixelmap row-by-row until a transition is detected between the selected color and any other color.

15. The apparatus of claim 12 wherein the means for analyzing the pixelmap includes processor means for defining primary-edge pixels by determining, with respect to an already-identified edge pixel, the colors of all neighboring pixels in a clockwise fashion until a pixel of the selected color is encountered after a pixel of any other color, and storing the pixelmap location of the thus-encountered pixel.

16. The apparatus of claim 12 further comprising user-interface means for accepting and transferring pairwise color-relationship rules to the electronic storage means.

* * * * *